(12) United States Patent
Handelsman et al.

(10) Patent No.: US 7,063,044 B2
(45) Date of Patent: Jun. 20, 2006

(54) MULTIPART CHEW TOY

(75) Inventors: Simon Handelsman, Newbury Port, MA (US); Chin Cheng Lai, Taipei (TW)

(73) Assignee: The Hartz Mountain Corporation, Secaucus, NJ (US)

(*) Notice: Subject to any disclaimer, the term of this patent is extended or adjusted under 35 U.S.C. 154(b) by 0 days.

(21) Appl. No.: 10/755,482

(22) Filed: Jan. 12, 2004

(65) Prior Publication Data

US 2005/0166865 A1   Aug. 4, 2005

(51) Int. Cl.
  *A01K 29/00*  (2006.01)
(52) U.S. Cl. ...................... 119/709; 119/711
(58) Field of Classification Search ........ 119/707–711; D30/160
  See application file for complete search history.

(56) References Cited

U.S. PATENT DOCUMENTS

| | | | |
|---|---|---|---|
| 848,136 A * | 3/1907 | Smith ........................ 119/711 |
| 2,003,958 A | 6/1935 | Salisbury |
| 3,832,877 A | 9/1974 | Tominaga |
| 3,871,334 A | 3/1975 | Axelrod |
| 4,513,014 A | 4/1985 | Edwards |
| 4,674,444 A | 6/1987 | Axelrod |
| 4,771,733 A | 9/1988 | Axelrod |
| 4,802,444 A | 2/1989 | Markham et al. |
| 4,919,083 A | 4/1990 | Axelrod |
| 4,924,811 A | 5/1990 | Axelrod |
| 4,928,632 A | 5/1990 | Gordon |
| 4,955,914 A | 9/1990 | Caniglia et al. |
| D320,495 S | 10/1991 | Pallesen |
| 5,148,770 A | 9/1992 | O'Rourke |
| 5,174,243 A | 12/1992 | O'Rourke |
| 5,200,212 A | 4/1993 | Axelrod |
| D337,398 S | 7/1993 | Axelrod |
| 5,263,436 A | 11/1993 | Axelrod |
| 5,271,688 A * | 12/1993 | Chang ........................ 403/290 |
| D343,262 S | 1/1994 | Axelrod |
| 5,339,771 A | 8/1994 | Axelrod |
| D357,952 S | 5/1995 | Chen |
| D358,007 S | 5/1995 | Axelrod |
| 5,419,283 A | 5/1995 | Leo |
| 5,476,069 A | 12/1995 | Axelrod |
| 5,485,809 A | 1/1996 | Carroll |
| 5,595,142 A | 1/1997 | Chill |
| 5,647,302 A | 7/1997 | Shipp |
| D384,985 S | 10/1997 | Cronic |
| 5,766,223 A | 6/1998 | Johnson |
| 5,832,877 A | 11/1998 | Markham |

(Continued)

*Primary Examiner*—Teri Pham Luu
*Assistant Examiner*—Kimberly S. Smith
(74) *Attorney, Agent, or Firm*—Stroock & Stroock & Lawn LLP

(57) ABSTRACT

A chew toy for pets can be produced as a combination of different materials, preferably with a rigid shell and softer chew portions extending from the shell. The shell can have multiple parts that join together to encase a mounting structure or frame, which can include threaded portions that connect to the chew portions. The shell can also include apertures through which the chew portion can protrude. The chew portion can include a plurality of projections extending outward from the base. The rigidity of the shell can provide structure, protect the internal structure, and provide extra support for the chew portions, whereas the softer chew portions can provide beneficial effects to a pet's teeth or gums or provide greater chewing pleasure. A scented insert can be housed within the shell and the scent can be emitted through passageways through the shell.

30 Claims, 11 Drawing Sheets

U.S. PATENT DOCUMENTS

| | | |
|---|---|---|
| 5,857,431 A | 1/1999 | Peterson |
| 5,912,285 A | 6/1999 | Godsey |
| 5,941,197 A | 8/1999 | Axelrod |
| 5,947,061 A | 9/1999 | Markham et al. |
| 6,067,941 A | 5/2000 | Axelrod |
| 6,112,703 A | 9/2000 | Handelsman |
| 6,116,191 A | 9/2000 | Suchowski et al. |
| 6,283,063 B1 | 9/2001 | Zalevsky |
| 6,305,326 B1 | 10/2001 | Suchowski et al. |
| 6,360,695 B1 | 3/2002 | Suchowski et al. |
| 6,415,741 B1 | 7/2002 | Suchowski et al. |
| 6,769,690 B1 * | 8/2004 | Khoudary ............... 273/153 S |
| D501,961 S * | 2/2005 | Jager ........................ D30/160 |
| 6,981,471 B1 * | 1/2006 | Dubinins et al. ........... 119/710 |
| 2003/0079693 A1 * | 5/2003 | Jager ........................ 119/707 |

* cited by examiner

MULTIPART CHEW TOY

BACKGROUND OF THE INVENTION

The invention relates generally to chew toys for pets and more particularly to a chew toy having a therapeutic effect on a dog's teeth and gums.

Various products exist in the market which are intended to clean a pet's teeth as the pet chews the product, or to satisfy a pet's chewing urge. Most of the chew toys available are formed of one type of material, which is usually either too hard and exposes the dog's mouth to undesirably hard or sharp products, or too soft and is not sufficiently durable.

Another type of chew toy available is a toy formed of two materials of different hardness and rigidities as disclosed in U.S. Pat. No. 6,415,741 (hereinafter the '741 patent). The chew toy disclosed in the '741 patent can also encompass another desired feature of pet chew toys, which is a scent or flavor that will not come off on the hands of the person handling the toy. A scented insert is placed within the chew toy, which allows the scent to emanate out of the chew toy, rather than adding a scent to the surface of the chew toy.

Certain embodiments of this chew toy, however, can have undesirable attributes. For example, with adequate force, the chew portions can be pulled out from the shell of the toy. Due to the design of the securing member, they can be difficult to reinsert. Also, the manufacture of the '741 chew toy can be difficult, and a simpler means of manufacturing the chew toy is desirable.

Accordingly, it is desirable to provide a synthetic chew toy for a pet, such as a dog, which overcomes the shortcomings of existing chew toys.

SUMMARY OF THE INVENTION

Generally speaking, in accordance with the invention, a synthetic chew toy formed as a composite of different materials of differing hardness and rigidity is provided in which the shell of the toy encases a mounting structure that connects the chew portions. The chew toy can include a flavor or scent (hereinafter collectively scent) impregnated insert within the shell. The toy can be formed with a rigid synthetic shell, supporting one or more softer chew portions. The shell can consist of a plurality of pieces that preferably fit together to create a shell, defining an inner space or volume to receive the mounting structure. The chew portion can include a plurality of projections, preferably having a generally cylindrical shape with a hemispheric end, extending outward from the base of the chew portion. The chew portion can also mount onto the mounting structure through apertures in the shell portion, exposing the projections for the pet to chew on. Because the chew portions can be mounted through the apertures in the shell portion, production and repair are facilitated. A chew portion that is somehow removed from the shell portion or damaged can simply be replaced or mounted back on through the aperture from which it was removed. Thus, the rigidity of the shell portion provides structure, support and durability for the chew toy, and the relatively softer chew portion can provide beneficial effects to a pet's teeth and gums, or stimulate greater chewing, and can be replaceable. By locating a scent module within the body of the toy, less of the scent is likely to get on one's hands when the toy is handled. Many or all of the desirable attributes of certain chew toys formed in accordance with the '741 patent are preserved while providing improved manufacture and repair and making the chew toy more durable.

Accordingly, it is an object of the invention to provide an improved chew toy for pets, such as dogs, which overcomes the drawbacks of the prior art.

Another object of the invention is to provide an improved chew toy for pets, having relatively high durability while maintaining acceptable softness and flexibility.

Yet another object of the invention is to provide an improved chew toy for pets, which is relatively easy to manufacture.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
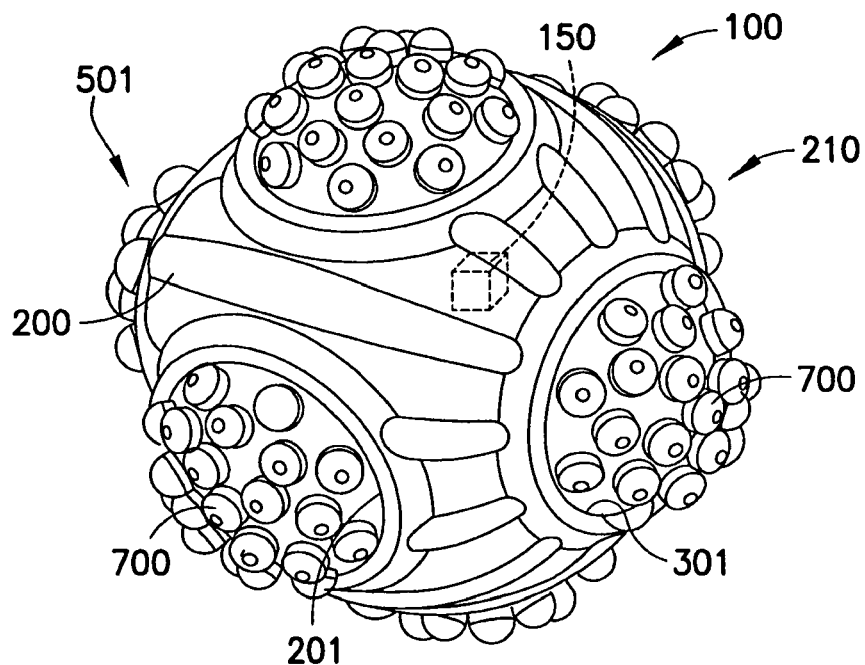
FIG. 1 is a perspective view of a chew toy constructed in accordance with an embodiment of the invention.

A chew toy constructed in accordance with an embodiment of the invention is shown generally in FIGS. 1–12. Chew toy 100 is provided with a substantially spherical shell 200 molded to have a plurality of mounting apertures 201, 301, 501 to receive a plurality of chew portions 700. Shell 200 need not be substantially spherical in shape, however, and can have any one of a variety of shapes, such as, for example, an elongated football shape, a bone shape, the shape of a food item, or a substantially cylindrical or tubular shape. Preferably, shell 200 is hollow, defining an interior volume 209, separated from ambient atmosphere 210. Shell 200 is preferably rigid and provides chew toy 100 with its rigidity and durability. Shell 200 is preferably formed from a rigid, durable, non-toxic material, for example, carioud rigid thermoplastic and thermosetting materials, such as various polymers and resins, preferably nylon, most preferably 6—6 nylon. Shell portion 200 is advantageously molded to have a hardness in the range of 70–80, preferably 82–89, most preferably 85 Shore D hardness (Scale Shore D). Chew toy 100 is sized and weighted so that it can be held in the mouth of a pet, such as dog. A diameter of 1 to 4 inches, preferably 1.5 to 3 inches is acceptable.

Chew portions 700 are preferably formed from a second material, which is considerably softer and more flexible than the material of shell 200. Although various resilient polymers can be used as the material to construct chew portion 700, a preferred material is polyurethane. Other natural and synthetic rubbers are also acceptable. Chew portion 700 should be molded to have a hardness in the range of 70 to 90, preferably 80–90, most preferably 85 Shore A hardness (Scale Shore A) as measured in a durameter. The materials, weight, hardness and construction of chew toys in accordance with the invention should be appropriate for use as a dog chew toy. A diameter of 0.5 to 2 inches is acceptable.

Referring generally to FIGS. 3A to 6B, shell 200 is preferably formed, such as by injection molding into two halves 300 and 500, which are joined together. Male half 300 is preferably molded with a ridge-like protrusion 303 and female half 500 is preferably molded with a groove 503. When the two halves 300 and 500 are joined together, protrusion 303 of male half 300 is matingly engaged with groove 503 of female half 500. Protrusion 303 and groove 503 are preferably annular, each following the circumference of each of respective halves 300, 500. Also, protrusion 303 and groove 503 can be either continuous, making a full, continuous path around the circumference of each of the respective halves, or discontinuous, in the form of several protrusions 303 and corresponding grooves 503.

In one embodiment, as shown in FIGS. 3–6, protrusions 303 and grooves 503 are discontinuous, being broken by the cutouts for joint apertures 201 in shell 200. Halves 300, 500 may be molded such that joint apertures 201 are centered on the seam between male half 300 and female half 500, with a first joint aperture wall 201a of joint aperture 201 being formed in male half 300, and a second joint aperture wall 201b being formed in female half 500. First joint aperture wall 201a of joint aperture 201 can be described as joint aperture wall 201a on male half 300, in which joint aperture 201 is only partially defined by male half 300. Likewise, the second portion, joint aperture wall 201b can be described as aperture wall 201b on female half 500, in which joint aperture 201 is only partially defined by female half 500. When male half 300 and female half 500 are joined, first joint aperture wall 201a and second joint aperture wall 201b are aligned to form a single joint aperture 201, which is fully encircled by shell 200. With halves 300, 500 formed in this manner, protrusion 303 and groove 503 are discontinuous, as discussed above. Halves 300 and 500 can also comprise aperture walls 301a and 501b, defining mounting apertures 301 and 501, respectively.

Referring again to FIGS. 3–6, shell 200 can include a plurality of ribs 311, 511 formed along the outer surface 314, 514 to provide added support and strength of shell 200. Ribs 311, 511 can also divert a dog's teeth away from the softer chew portion 700. Mounting apertures 201, 301, 501 can also include ribs 208, 308, 508 encircling apertures 201, 301, 501 to further stabilize chew portions 700 when mounted.

Shell 200 is further advantageously sealed by ultrasonically welding halves 300, 500 such that an integral shell 200 is formed, with the halves 300, 500 being fused into a single integral unit. Alternatively, other techniques, such as press filling or the use of adhesives and others known to those skilled in the art can be used to seal together halves 300, 500.

Figure 2A:
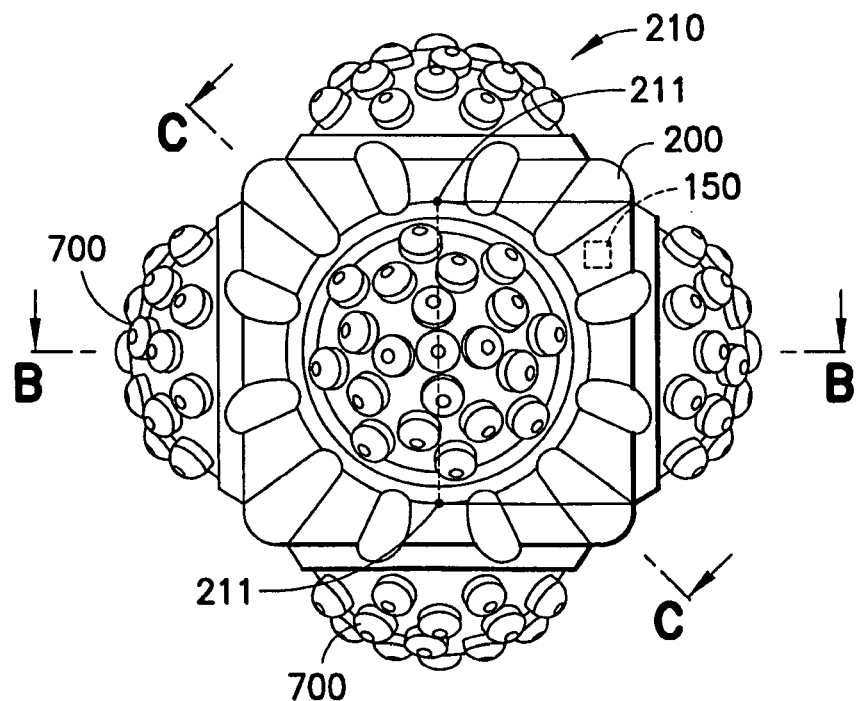
FIG. 2A is a plan view of the chew toy of FIG. 1.
Figure 2B:
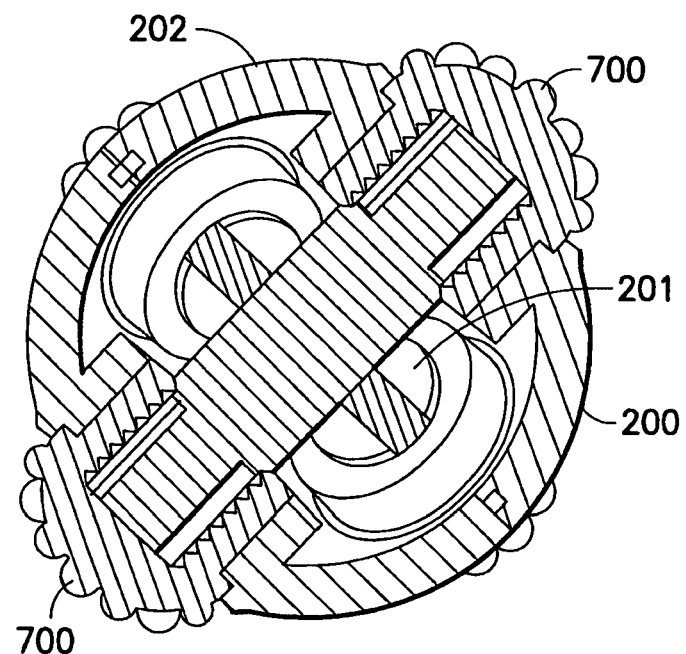
FIGS. 2B and 2C are cross-sectional views of the chew toy of FIG. 1, taken along section lines B—B and C—C, respectively.
Figure 2C:
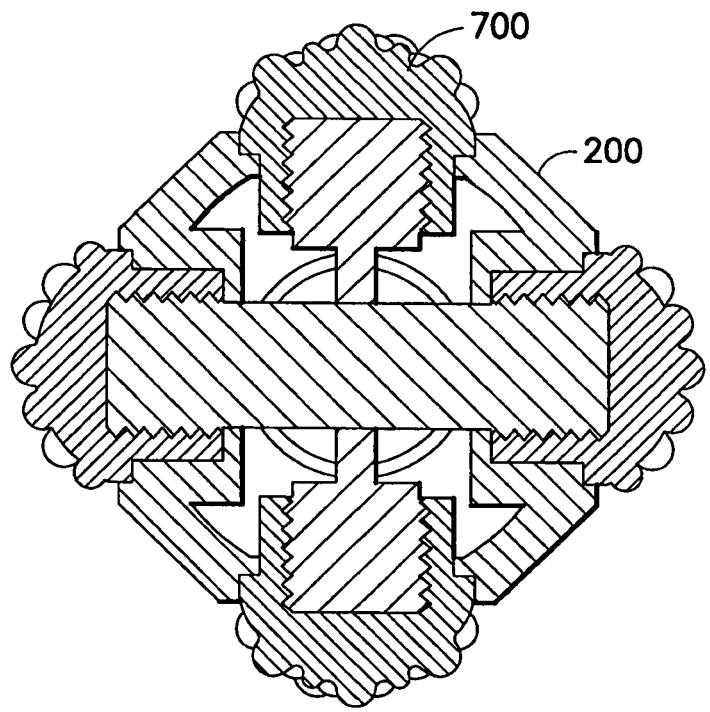
Figure 3A:
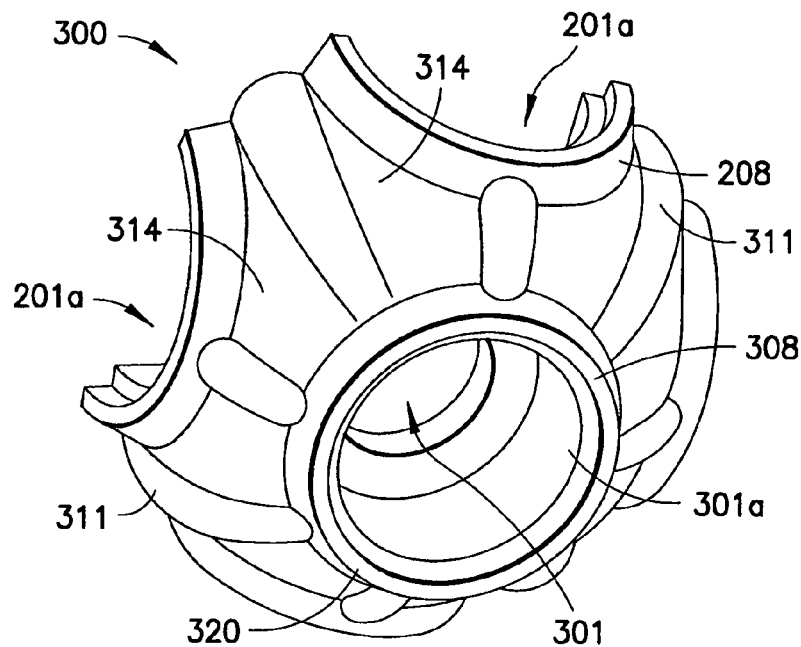
FIG. 3A is a perspective view of a first section of a shell portion of the chew toy of FIG. 1.
Figure 3B:
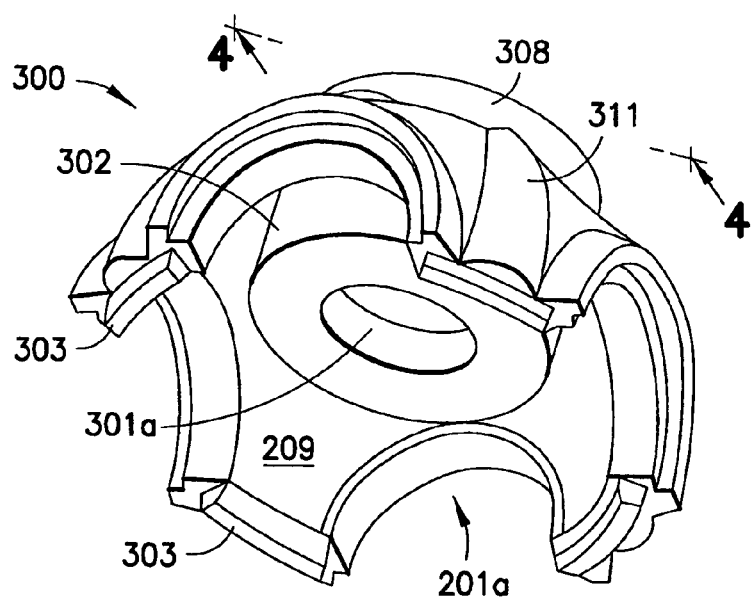
FIG. 3B is a reverse perspective view of the first section of the shell portion of FIG. 3A.
Figure 4A:
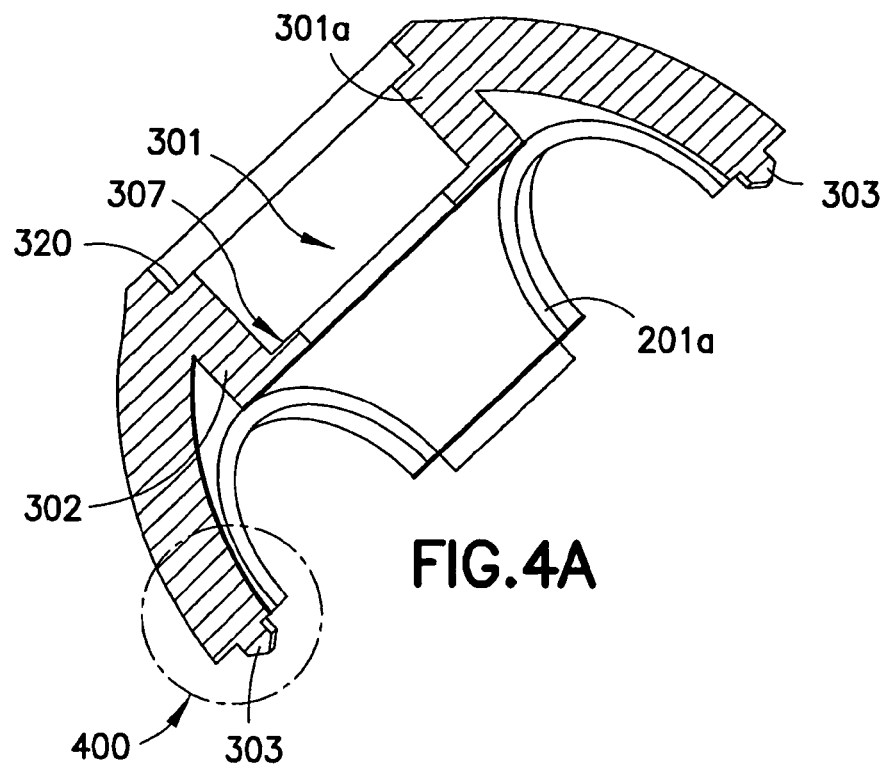
FIG. 4A is a cross-sectional view of the shell portion of FIG. 3B, taken along section line 4—4.
Figure 4B:
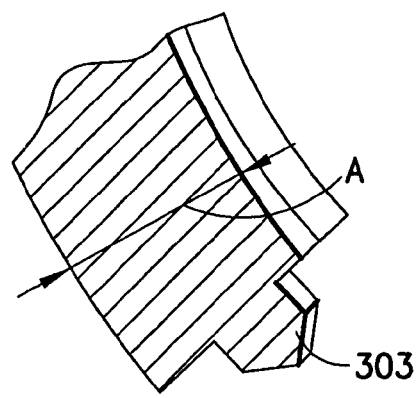
FIG. 4B is a magnified view of a selected portion of the shell portion of FIG. 4A.
Figure 5A:
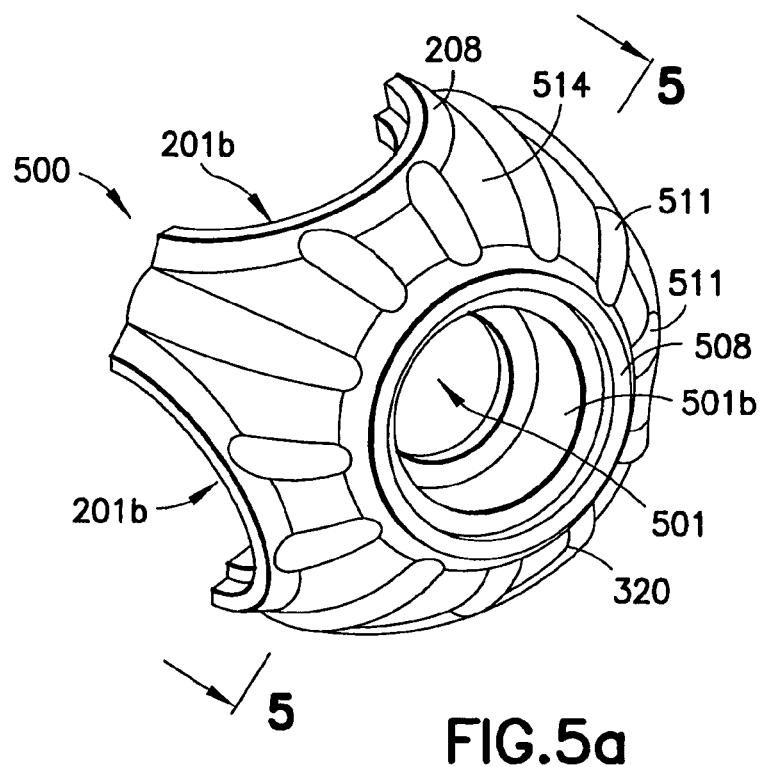
FIG. 5A is a perspective view of a second section of the shell portion of FIG. 1.
Figure 5B:
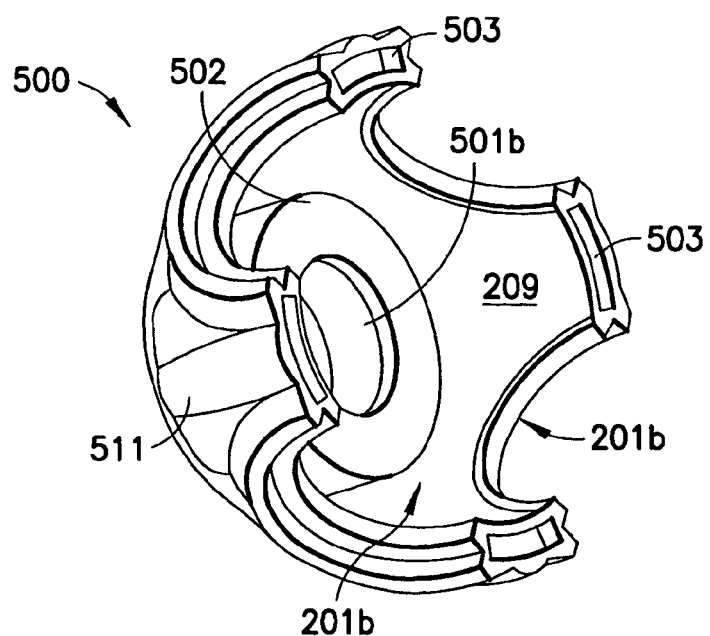
FIG. 5B is a reverse perspective view of the second section of the shell portion of FIG. 1A.
Figure 6A:
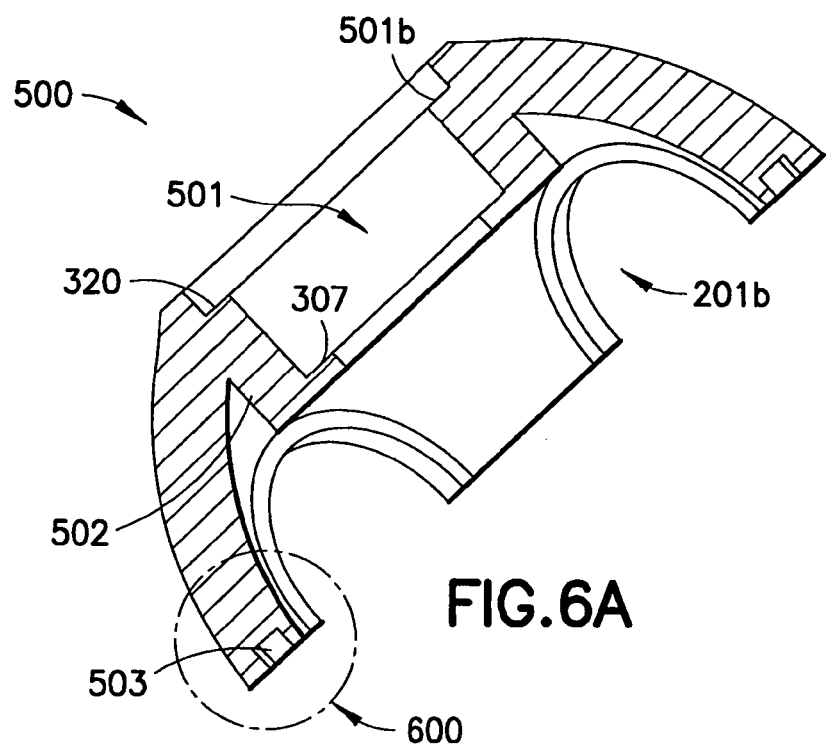
FIG. 6A is a cross-sectional view of the shell portion of FIG. 5A, taken along section line 5—5.
Figure 6B:
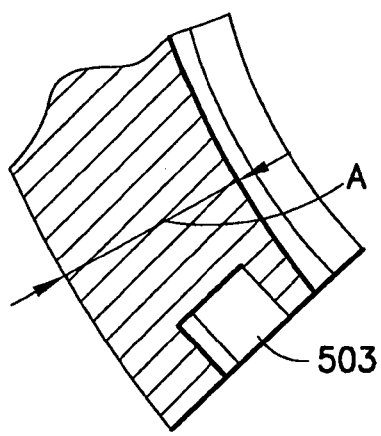
FIG. 6B is a magnified view of a selected portion of the shell portion of FIG. 6A.

Referring to FIGS. 2B–2C, there arc shown cross-sections of a preferred embodiment of the present invention with halves 300, 500 sealed together. As shown in FIGS. 4B and 6B, which illustrate magnified views of portions 400 and 600, respectively, shell wall 202 has a thickness A, which may depend upon the size of the toy, the type of chewing portions, or the chewing power of the dog for which the toy is intended. Further, the shell need not be formed from two halves, but could be molded or formed from three or more pieces.

Apertures 201, 301, 501 in shell 200 may be formed during the molding or forming process of halves 300, 500. Alternatively, some or all of apertures 201, 301, 501 may be formed in a second step by, for example, drilling or cutting the apertures in previously formed halves 300, 500. In a preferred embodiment, at least a part of an aperture 201, 301, 501 is molded on each half 300, 500, then, in a subsequent step, at least one aperture 201, 301, 501 is drilled in the shell.

Referring again to FIGS. 3–6, mounting apertures 301, 501 of halves 300, 500 can include supporting projections 302, 502 to provide additional support for chew portions 700.

Referring now to FIGS. 9–12, a preferred embodiment of the invention is provided with a mounting structure 900 comprising a T-shaped core frame 901 and a bolt member 951. T-shaped core frame 901 preferably has a plurality (such as 4) branches 902 tat are generally cylindrical in shape and extend outwardly from a core 904. Preferably, core 904 includes a core aperture 905 which bolt member 951 fits through. Bolt member 951 also includes a pair of branches 952 and a bolt core 954. When chew toy 100 is assembled according to a preferred embodiment of the invention, bolt core 954 fits through core aperture 905, and a middle portion 915 of bolt core 954 remains in core aperture 905. Whereas bolt member 951 is shown as having a generally cylindrical shape, it can have a variety of shapes and need not be substantially cylindrical in shape. Furthermore, although core aperture 905 is shown as being generally circular, it need not be circular, and can be a variety of shapes, for example, rectangular or triangular. However, core aperture 905 is preferably a shape suitable to receive and maintain bolt member 951 in a secure fit. T-shaped core frame 901 and a bolt member 95.

Figure 8A:
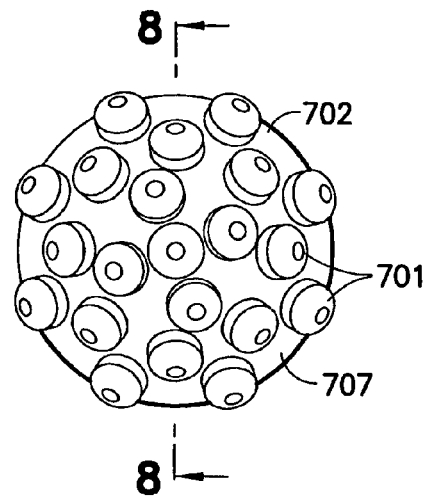
FIG. 8A is a top view of the chew portion of FIG. 7.

As shown in FIGS. 9–12, brunches 902, 952 can have structure for receiving chew portions 200. They preferably have treaded ends 903, 953. Chew portion 700 preferably comprises a mounting portion 106 constructed to secure to brunches 902, 952. Chew portion 700 is preferably opposed at 80° by another chew portion 700 mounted on the opposite end of branch 902,952, thereby making it more difficult for chew portion 700 from being removed from chew toy 100. In the embodiment shown, they have a threaded inner wall 704, as shown in FIG. 8C. Threaded ends 903, 953 engage with treaded inner wall 704 of mounting portion 706 of chew portion 700 and provide a secure attachment. Mounting structure 900 preferably is formed of a rigid, durable, non-toxic material as described above with reference to shell 200.

Figure 7:
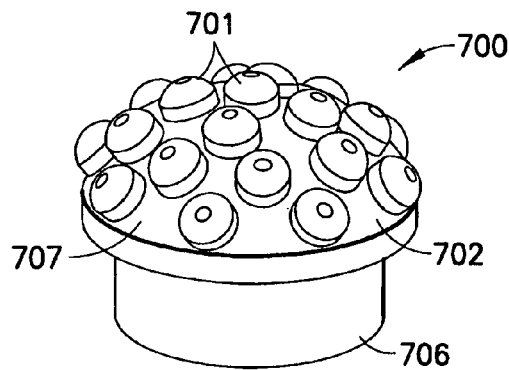
FIG. 7 is a perspective view of a chew portion of the chew toy of FIG. 1.
Figure 8B:
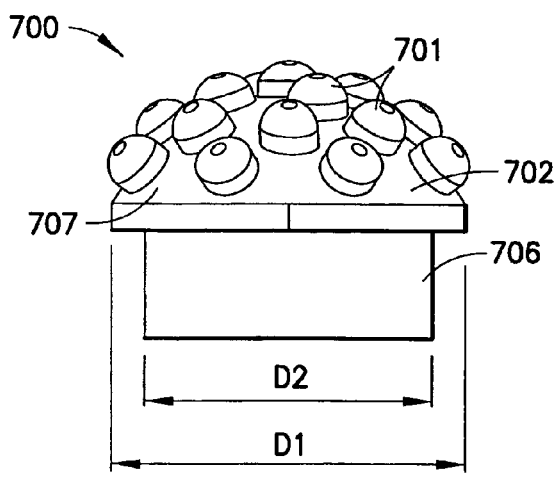
FIG. 8B is a side view of the chew portion of FIG. 7.
Figure 8C:
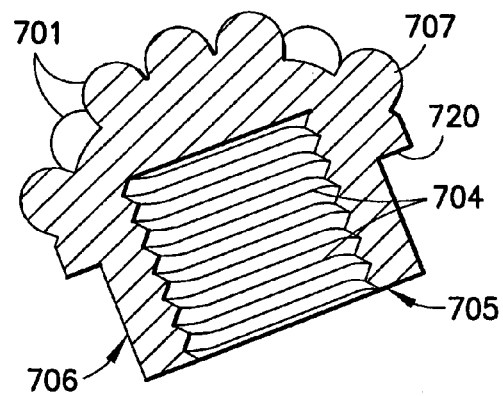
FIG. 8C is a cross-sectional view of the chew portion of FIG. 7, taken along line 8—8 of FIG. 8A.
Figure 9:
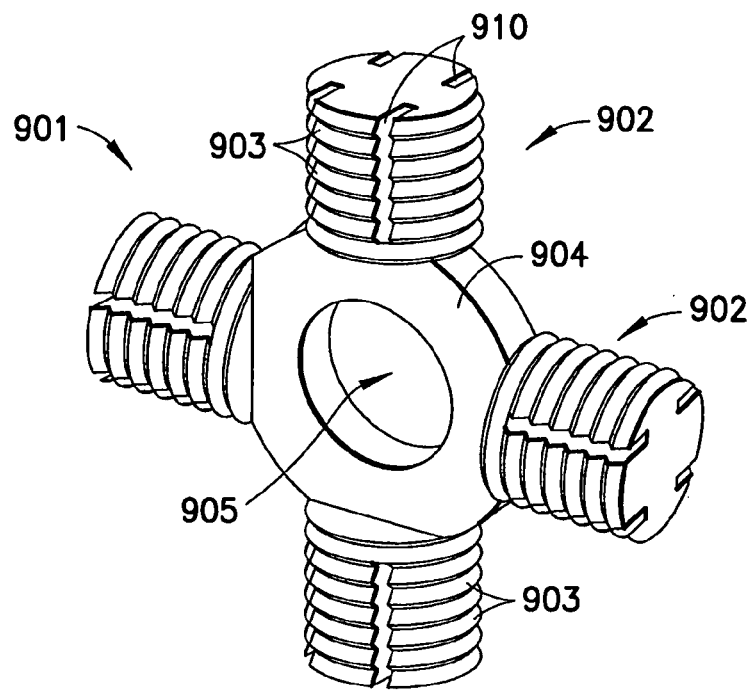
FIG. 9 is a perspective view of a T-shaped core frame of a mounting structure of the chew toy of FIG. 1.
Figure 10:
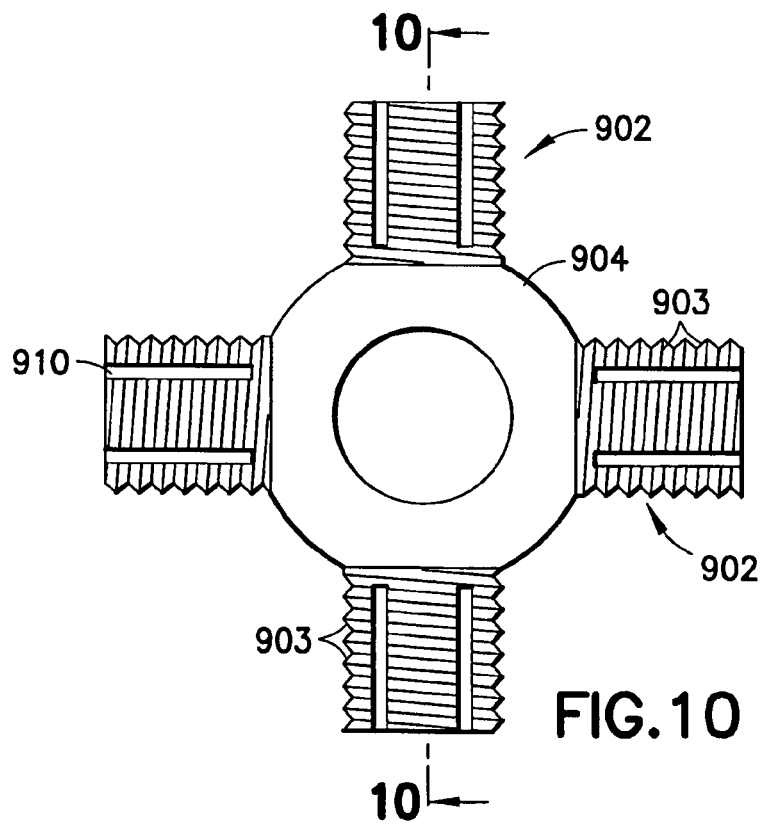
FIG. 10A is a front view of the frame of FIG. 9.
FIG. 10B is a side view of the frame of FIG. 9.
FIG. 10C is a cross-sectional view of the frame of FIG. 9, taken along section line 10—10 of FIG. 10A.
Figure 10B:
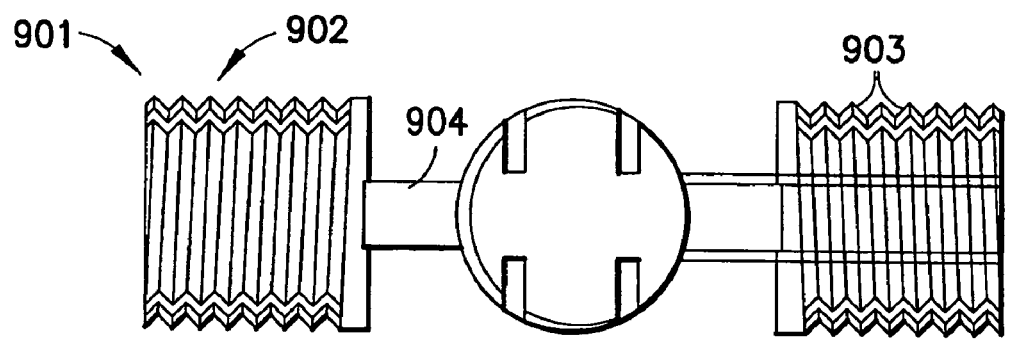
Figure 10C:
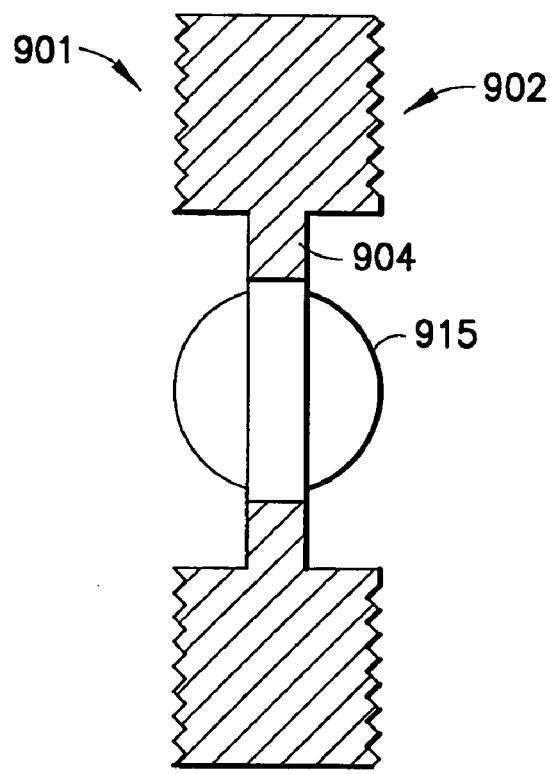
Figure 11:
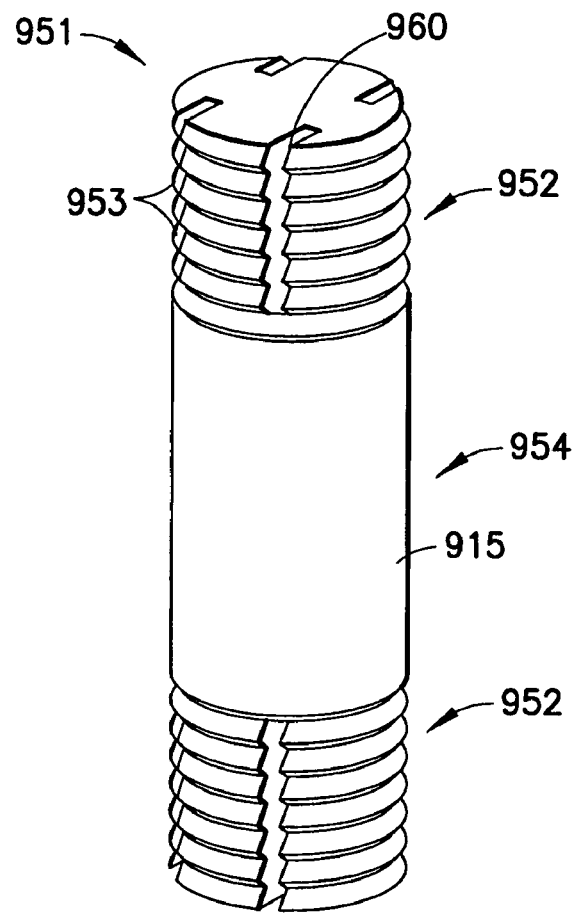
FIG. 11 is a perspective view of a bolt section of a mounting structure of the chew toy of FIG. 1.
Figure 12A:
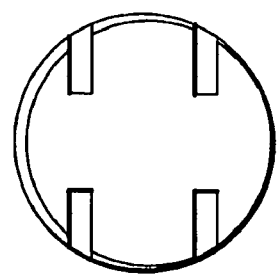
FIG. 12A is a front view of the bolt section of FIG. 11.
Figures 12B, 12C:
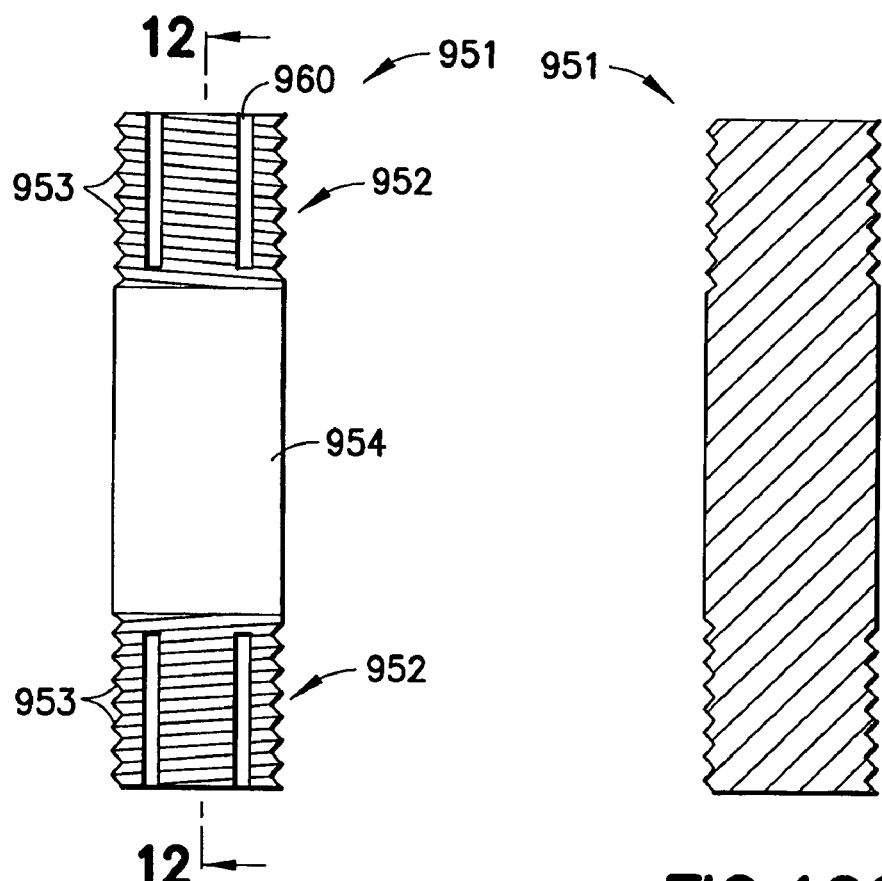
FIG. 12B is a side view of the bolt section of FIG. 11.
FIG. 12C is a cross-sectional view of the bolt section of FIG. 11, taken along section line 12—12 of FIG. 12B.

An embodiment of the chew portion 700 for use with the present invention is shown in FIGS. 7–8. A dome portion 707 of chew portion 700 is generally round when viewed from the top or bottom as shown in FIG. 7. Chew portion 700 can include a mounting portion 706 that mounts to mounting structure 900 and dome portion 707, which protrudes through mounting apertures 201, 301, 501, as shown in FIGS. 2A–C. Referring again to FIG. 8B, dome portion 707 has a first diameter D1 and mounting portion 706 has a second diameter D2. In a preferred embodiment of the invention, D1 is greater than D2.

As shown in FIG. 8C, mounting portion 706 of chew portion 700 is preferably provided with a threaded inner wall 704 to engage with threaded end 903, 953 of mounting structure 900 to mount and secure chew portion 700 onto mounting structure.

Preferably, chew portion 700 is unitarily formed of a single material. It should also be noted, however, that dome portion 707 and mounting portion 706 need not be formed of the same material, and may be formed of materials with differing hardness and resiliency characteristics.

As shown in FIGS. 7–8, dome 707 of chew portion 700 is preferably hemispherical with a plurality of projections 701 extending from a base 702 of dome 707. Referring to FIG. 8A, projections 701 are preferably arranged concentrically in bands of decreasing diameters. Alternatively, projections 701 may be disposed in a different, more random configuration than the concentric band arrangement. Referring to FIGS. 4A, 6A and 8C, chew portion 700 is preferably constructed to have a base surface 705 that engages with a bottom mounting support surface 307 defining the base of mounting apertures 201, 301, 501 of shell 200. Chew portion 700 can also be constructed to have a top support surface 720 that engages with a top mounting surface 320 immediately surrounding mounting apertures 201, 301, 501 of shell 200. The combinations of base surface 705 and bottom mounting support surface 307 and the combination of top support surface 720 and top mounting surface 320 can either or both be included in chew toy 100 to prevent chew portion 700 from extending further into shell 200 as shown in FIGS. 2B and 2C.

Preferably, top support surface 720 engages top mounting surface 320 below the surface of shell 200. Chew toys such as those depicted in U.S. Pat. No. 6,415,741 can provide chew toys having chew portions mounted on the surface of the chew toy. An inadequacy that can occur with these chew toys is that a dog can get its teeth under the base of the chew portion and pull it out. This embodiment of chew toy 100 substantially eliminates this risk. In order for a dog to pull out chew portion 700, the dog must secure its teeth under dome portion 707 to pull it out. More specifically, the dog's teeth must engage top support surface 720. Because top support surface 720 is below the surface of shell 200, the dog is prevented from getting its teeth under dome portion 707 and thereby from pulling out chew portion 700. As shown in FIGS. 1 and 2, chew portion 700 can further be protected by rib 208, 308, 508, which preferably provide a circumferential barrier around chew portion 700, thereby making it even more difficult for the dog to get its teeth in mounting aperture 201, 301, 501.

An aroma insert 150 may be placed in one or both halves 300, 500 prior to sealing halves 300, 500 together. The aroma insert 150 may be formed from a porous or spongy material, or any material known in the art that can retain an aroma. The aroma insert 150 can be saturated, such as by dipping or injection filling, with a flavor or aroma additive such as bacon or other aromas that can be pleasing to pets, and dogs in particular. Preferably, the aroma insert 150 is saturated prior to disposal in shell 200. The aroma can migrate from an interior volume 209 of chew toy 100 and can enter an ambient atmosphere 210, adding to the enjoyment of the pet.

The passage of the aroma from interior volume 209 to ambient environment 210 can be facilitated by shell 200 being made of a material, such as nylon, that facilitates passage of aromas through its structure. Alternatively, chew toy 100 may be formed with a small hole or channel 211, for example, in chew portions 700 or shell 200 to further facilitate the emission of the aroma into ambient environment 210. In an embodiment shown in FIG. 2A, shell 200 includes channels 211 through which the scent can travel out of the chew toy into the environment. Alternatively, scent and flavor additives can be compounded with the material prior to molding to form shell 200 or chew portions 700. The passage of the aroma can also be facilitated by including channels 910, 960 in T-shaped core frame 901 and bolt member 951. The aroma can travel from interior volume 209 through channels 910, 960, through chew portions 700 and into ambient atmosphere 210. Chew portions 700 can facilitate passage of aromas, for example, by being made of a material, such as nylon, that facilitates passage of aromas through its structure, or by being formed with a small hole or channel. According to a preferred embodiment of the invention, channels 211 are sized and constructed to prevent physical contact with aroma insert 150 when chew toy 100 is handled.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A chew toy comprising:
   a shell structure formed from materials and configured to be suitable to be chewed on by a dog without injuring the animal's mouth and teeth, the shell structure having an inside and an outside, and having a first hardness and rigidity;
   a mounting structure within the shell structure; and a plurality of chew portions formed from materials and configured to be suitable to be chewed on by a dog without injuring the animal's mouth and teeth, the chew portions mounted on the mounting structure and having a second rigidity substantially less rigid than that of the first rigidity and a second hardness substantially less hard than that of the first hardness, the mounting structure interconnection separate chew portions and comprising a plurality of arms securing the chew portions to the outside of the shell structure, wherein the chew portions are positioned on the outside of the shell structure so that a dog's teeth will contact both the shell structure and the chew portions when a dog chews on the chew toy.

2. The chew toy claimed in claim 1, further comprising an insert, wherein the insert contains a scent emitting material and is housed within the shell portion.

3. The chew toy claimed in claim 2, wherein the shell portion has a passage therethrough, through which scent from the insert can be emitted, the passages sized and constructed and the insert located in the shell to prevent physical contact with the insert when the pet chew toy is handled.

4. The chew toy claimed in claim 2, wherein the at least one of the plurality of chew portions has a passage through which scent from the insert can be emitted, the passages sized and constructed and the insert located in the shell to prevent physical contact with the insert when the pet chew toy is handled.

5. The chew toy claimed in claim 1, wherein the shell includes one of more circular apertures wherein a portion of at least one of the plurality of chew portions portion is dome shaped and protrudes through the aperture.

6. The chew toy claimed in claim 5, wherein a portion of the at least one of the plurality of chew portions extends outside the shell portion.

7. The chew toy claimed in claim 6, wherein the dome shaped portion includes a plurality of projections.

8. The chew toy claimed in claim 5, wherein the shell includes one or more ribs outlining the apertures for added support.

9. The chew toy claimed in claim 1, wherein the shell comprises nylon.

10. The chew toy claimed in claim 1, wherein the shell has ridges for added structure and strength.

11. The chew toy claimed in claim 1, wherein the shell is generally spherical in shape.

12. The chew toy claimed in claim 1, wherein the shell comprises two equal-sized halves.

13. The chew toy claimed in claim 1, wherein a first one or more sections of the shell comprise one or more protrusions.

14. The chew toy claimed in claim 13, wherein a second one or more sections of the shell comprise one or more grooves wherein the protrusions engage the grooves.

15. The chew toy claimed in claim 1, wherein the at least one of the plurality of chew portions comprises polyurethane.

16. The chew toy claimed in claim 1, wherein the chew portion includes a plurality of projections.

17. The chew toy claimed in claim 16, wherein the projections are cylindrical with hemispheric ends.

18. The chew toy claimed in claim 1, wherein the at least one of the plurality of chew portions is counter-sunk into the shell.

19. The chew toy claimed in claim 18, wherein at least one of the plurality of chew portions includes one or more nylon ridges to prevent the at least one of the plurality of chew portions from being pulled out.

20. The chew toy claimed in claim 1, wherein at least one of the plurality of chew portions comprises a hollow mounting portion that mounts on the mounting structure.

21. The chew toy claimed in claim 20, wherein the mounting structure comprises at least two members that intersect each other.

22. The chew toy claimed in claim 21, wherein the hollow mounting portion includes a threaded inner wall and the members have threaded ends to engage with the threaded inner wall of the hollow mounting portions.

23. The chew toy claimed in claim 20 wherein the hollow mounting portion includes a threaded inner wall and the mounting structure includes one or more threaded portions to engage wit the threaded inner wall of the hollow mounting portion of at least one of the plurality of chew portions.

24. The chew toy claimed in claim 1, wherein the mounting structure comprises a T-shaped core and a bolt, extending threaded ends in six directions.

25. The chew toy claimed in claim 1, wherein the mounting structure comprises nylon.

26. The chew toy claimed in claim 1, wherein the mounting structure comprises a first section and a second section wherein:
the first section includes an aperture; and
the second section fits through the aperture of the first section.

27. The chew toy claimed in claim 26, wherein the aperture is substantially the same shape and size as a cross section of the second section to provide a secure fit of the second section in the aperture of the first section.

28. The chew toy claimed in claim 1, wherein the mounting structure has the same rigidity and hardness as the shell portion.

29. The chew toy claimed in claim 2, wherein the scent-emitting material in the insert emits a food scent.

30. The chew toy claimed in claim 2, wherein the scent-emitting material is a piece of sponge with liquid aroma.

* * * * *